D. E. WHITON.
Drill and Lathe-Chuck Attachment.
No. 203,571. Patented May 14, 1878.
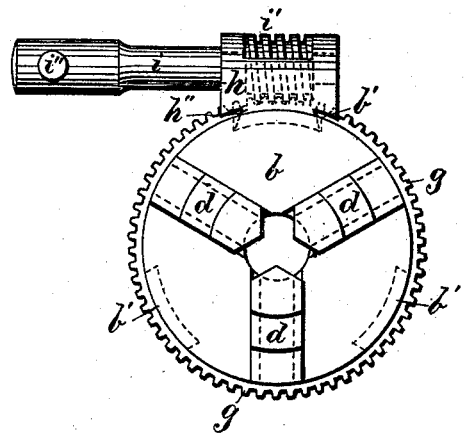
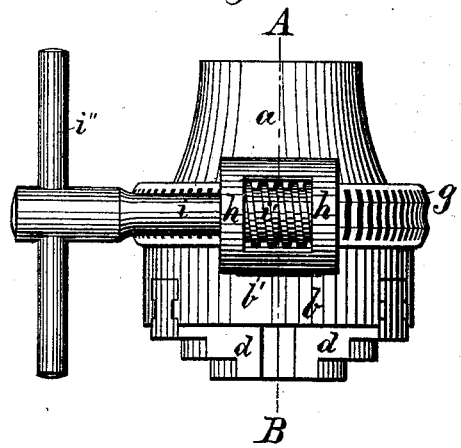
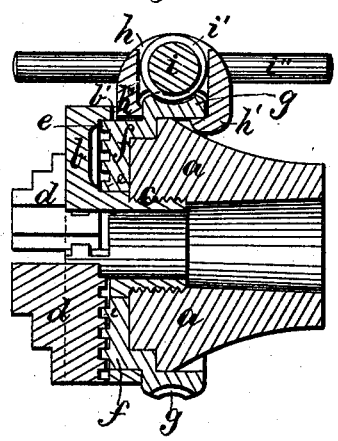
Witnesses:
Henry Chadbourn.
Wm. Howard Edmands.
Inventor:
David E. Whiton
by Alban Andrew
his atty.

UNITED STATES PATENT OFFICE.

DAVID E. WHITON, OF WEST STAFFORD, CONNECTICUT.

IMPROVEMENT IN DRILL AND LATHE CHUCK ATTACHMENTS.

Specification forming part of Letters Patent No. 203,571, dated May 14, 1878; application filed April 15, 1878.

*To all whom it may concern:*

Be it known that I, DAVID E. WHITON, of West Stafford, in the county of Tolland and State of Connecticut, have invented certain new and useful Improvements in Drill and Lathe Chuck Attachments; and I do hereby declare that the following is a full, clear, and exact description of my invention, which will enable others skilled in the art to which it appertains to make and use the same, reference being had to the accompanying drawings, and to letters of reference marked thereon, which form a part of this specification.

My invention relates to a new and useful attachment for drill and lathe chucks, for the purpose of operating the jaws of the chuck to and from each other; and this my invention consists of a detachable bearing, in which is located a worm-shaft operated by means of a suitable handle, in combination with a worm-gear on the back plate or movable part of the chuck, by which arrangement the chuck can be very easily operated, so as to open or close the jaws simply by temporarily attaching the detachable bearing carrying the worm-shaft, and turning the handle thereof in the desired direction. After the chuck is set and the work secured between its jaws I detach the aforesaid bearing and its worm-shaft from the chuck, and when the said bearing and shaft are removed from the chuck it is perfectly true and evenly balanced, without any projecting parts likely to catch hold of the operator's garments during the rotation of such chuck.

This attachment may be used to equal advantage on most all kinds of chucks, although in the accompanying drawings I have shown it as applied to an ordinary scroll-chuck.

Before my detachable bearing with its worm is applied to the chuck the jaws can be opened or closed rapidly by turning the back plate of the chuck by hand, in the usual manner, thus quickly setting the jaws to receive either a large or small piece; and when the piece to be held is placed in position by the use of my invention the jaws of the chuck can be closed upon it with much greater force than by any means now in use, thus holding the work in a most firm and rigid manner.

In nearly all drill-chucks the power to operate them is applied in the direction of the rotation of the chuck; consequently the chuck must be blocked or held from turning in some way while the power is being applied; but by the use of my invention the power is applied with great force at right angles to the rotation of the chuck; consequently it remains stationary without the use of blocking or other means of holding it in position.

On the accompanying drawings, Figure 1 represents a front elevation of an ordinary scroll-chuck provided with my improvement. Fig. 2 represents a plan view of the same; and Fig. 3 represents a certain longitudinal section on the line A B, (shown in Fig. 2.)

Similar letters refer to similar parts wherever they occur on the different parts of the drawings.

$a$ represents the hub of an ordinary chuck, secured to the front plate $b$ by means of a screw-thread, $c$, in the usual manner. $d\ d\ d$ represent the jaws, movable to and from the center in grooves in the front plate, as usual. $e\ e\ e$ represent the scroll on the movable back plate $f$, for the operation of the jaws $d\ d\ d$, in the ordinary way. $g$ is the worm-wheel, cut on the circumference of the back plate $f$, as shown. $h$ is the detachable bearing for the worm-shaft $i$, provided with the worm $i'$ and handle $i''$, as shown.

I prefer to provide said bearing with a suitable lip or hooked flange, $h'$, resting against the inside of the worm-wheel $g$, as shown in Fig. 3, and on its opposite side with a projection, $h''$, resting in a suitable recess or perforation, $b'$, on the front plate $b$, as shown in Fig. 3. I prefer to make a number of these perforations or recesses, as shown at $b'\ b'\ b'$ in dotted lines in Fig. 1.

I have hereinbefore described the manner in which the detachable bearing and its worm-shaft are temporarily secured to the chucks for its operation; but I do not wish to confine myself to this exact and precise mechanism, as I can, to equal advantage, change such connecting mechanism without departing from the spirit of my invention, the gist of which is a detachable worm-shaft and bearing for the operation of the jaws on the front plate of a drill or lathe chuck.

What I wish to secure by Letters Patent, and claim, is—

1. The herein-described drill and lathe chuck attachment, consisting of the detachable bearing $h$, with its worm-shaft $i$ $i'$ and handle $i''$, in combination with the worm-wheel $g$, as and for the purpose set forth.

2. A detachable bearing, $h$, carrying a worm-shaft, $i$, having a lip or hooked flange, $h'$, and on the opposite side a projection or plain flange, $h''$, resting in a recess, $b'$, in the front chuck-plate $b$, as and for the purpose set forth.

In testimony that I claim the foregoing as my own invention I have affixed my signature in presence of two witnesses.

DAVID E. WHITON.

Witnesses:
JULIUS CARRUSI,
ED. WHITON.